United States Patent [19]

Webb

[11] 4,207,191
[45] Jun. 10, 1980

[54] ANTI-POLLUTION BOOM

[75] Inventor: Michael G. Webb, Wootton Bridge, England

[73] Assignee: The British Petroleum Company Limited, Middlesex, England

[21] Appl. No.: 5,789

[22] Filed: Jan. 23, 1979

[30] Foreign Application Priority Data

Feb. 4, 1978 [GB] United Kingdom ............... 04550/78

[51] Int. Cl.² .............................................. E02B 15/04
[52] U.S. Cl. ......................... 210/242 S; 210/DIG. 25; 405/63
[58] Field of Search ....... 210/242 R, 242 S, DIG. 25, 210/DIG. 26; 405/26, 63, 64, 65, 72

[56] References Cited

U.S. PATENT DOCUMENTS

| | | | |
|---|---|---|---|
| 3,221,884 | 12/1965 | Muller | 210/242 R |
| 3,476,246 | 11/1969 | Dahan | 210/83 |
| 3,503,214 | 3/1970 | Desty et al. | 210/242 R X |
| 3,533,240 | 10/1970 | Lesh | 61/5 |
| 3,567,019 | 3/1971 | Headrick | 210/87 |
| 3,631,984 | 1/1972 | Rath | 210/83 |
| 4,112,689 | 9/1978 | Webb | 405/63 |

Primary Examiner—William A. Cuchlinski, Jr.
Attorney, Agent, or Firm—Morgan, Finnegan, Pine, Foley & Lee

[57] ABSTRACT

Anti-pollution barrier comprises a buoyant air tube, a ballast water tube and a membrane. Sections of reduced diameter in the air tube provide weirs over which surface oil and water spill. An oil and water discharge tube is provided which may be inside or outside the water tube. If inside, then one end of the membrane is connected to the air tube and the other end to the ballast tube to form a gallery for reception of the overspill. If outside, then one end of the membrane is connected to the air tube and the other end to the discharge tube to form the gallery. Pumps may be provided in the discharge tube to remove overspill from the gallery.

12 Claims, 5 Drawing Figures

ANTI-POLLUTION BOOM

The present invention relates to a barrier for the containment and recovery of oil spilt on water.

In recent years occurrences of oil spillage at sea have increased and many proposals have been made for the containment and recovery of spilt oil. Most systems proposed have been designed to cope with finite spillages which may occur when a tanker or other oil carrying vessel is involved in an accident. With the increase in off-shore oil production there is an increasing possibility of oil pollution occurring on a large scale should oil wells blow out or oil pipes rupture. Although every precaution is taken to prevent such disasters and to minimise their effect by incorporating oil shut off devices within oil production units there nevertheless remains the possibility that an accident to an oil production unit or to a very large tanker could produce a continuing source of oil pollution which would extend the capability of known oil containment and recovery systems.

British patent specifications 1188156 and 1383315 and application 43513/76 describe barriers for oil spilt on water which comprise one or more air chambers and one or more water chambers, all the walls of the chambers being formed of flexible material, the chambers being so positioned that when suitably inflated with air and water the barriers with float with part below and part above the water surface so as to impede the passage of floating oil. Such a barrier is very effective for impeding the flow of oil and forming a corral within which the oil can be collected. The collected oil then has to be removed by some form of skimming device. The rate of oil removal is thus limited to the capacity of the skimming device employed.

An object of the present invention is to provide a barrier for the containment of oil spilt on water which can also be employed in its recovery.

According to the present invention there is provided a barrier for the containment and recovery of oil spilt on water, the barrier comprising an elongate, flexible, buoyant, inflatable air chamber having a plurality of sections of reduced diameter; an elongate, flexible, inflatable ballast water chamber; an elongate, flexible, oil and water discharge tube; and an elongate membrane, one end of the membrane being connected to the exterior of the air chamber and the other to the exterior of the ballast water chamber or the oil water discharge tube to form a gallery; the buoyant air chamber and the oil and water discharge tube being joined to the ballast water chamber in side-by-side relationship; the chambers, tube and membrane being so positioned relative to one another that when in use on oil polluted water the buoyant air chamber and the ballast water chamber together form a barrier for oil spilt on water except in the sections of reduced diameter of the buoyant air chamber; these sections and the ballast water chamber defining a series of weirs for oil and water to pass into the gallery; the oil and water discharge tube being provided with means to remove oil and water from the gallery.

The oil and water discharge tube may be inside or outside of the water ballast tube. If it is outside, then the gallery is formed by the ballast water chamber, the oil and water discharge tube and the membrane. If it is inside, then the gallery is formed by the ballast water chamber and the membrane.

The chambers of the present invention are essentially similar to those described in UK patent specification 1188156 and are flexible in order that they can follow the movement of the sea so that the barrier remains effective under sea conditions that would severely reduce the efficiency of a rigid barrier. Suitably they are made of sheets of flexible material, e.g., neoprene coated nylon or other similar material. The flexibility of the material forming the barrier allows it to be stored, when deflated, in a comparatively small volume.

The chambers and tube can be readily prepared from flat sheet material by welding or otherwise joining the sheets together and since all are joined together it may be convenient to form them from a single sheet of the flexible material.

The flexible buoyant air chamber and the ballast water chamber serve essentially the same function as the air and water chambers described in UK patent specification 1188156. In practice it is found that good results are obtained when the cross sectional areas of the unreduced sections of the air chamber and the ballast water chamber are substantially the same but of course barriers can readily be prepared in which the cross sectional areas vary, for example, in the ratio of 1:4 to 4:1. UK patent specification 1383315 describes the use of a pilot air tube in association with the air chamber in order to aid the deployment and recovery of the barrier. Such a pilot tube can usefully be incorporated into the barrier according to the present invention.

As previously stated, the buoyant air chamber and the water ballast chamber form for the greater proportion of their length a barrier for oil and water. However, periodically the diameter of the air chamber is reduced, thus leaving gaps above the water chamber and between the water chamber and the sections of the air chamber of reduced diameter. In use, these gaps form weirs over which oil and water passes into the gallery where it is restrained by the membrane and removed by the oil and water discharge tube.

Preferably the sections of air chamber of reduced diameter are produced by tapering the diameter of the air chamber to a lesser value than the original, maintaining the diameter at the lesser value for some length and then increasing the diameter again to its original value.

The sections of reduced diameter may extend in total over 10–50% of the length of the barrier, preferably over 15–30%. The amount by which the diameter is reduced is not critical provided that it leaves a gap sufficient to cope with the flow of oil and water over the weirs. In general, a reduction in diameter of 10–50%, preferably 15–30%, will be sufficient to form satisfactory gaps for the weirs.

In use the barrier will first have to be deployed and then the various chambers inflated with air or water as appropriate.

The techniques described in patent specifications 1188156 and 1383315 can be used to inflate the chambers with air or sea water. In operation oil entrapped within the boom will spill over the weir with sea water into the gallery from which it must be removed. Suitable removal means comprise a series of drain holes in the oil and water discharge tube opening into the gallery, through which the oil water mixture can flow into a collection vessel. Such drain holes can readily be provided in the manufacture of the barrier along the join of the oil and water discharge tube with the ballast water chamber. Pumps may be provided in the discharge tube positively to pump recovered oil and water out of the barrier through the tube to storage. A useful storage vessel can be formed by a tanker which has been equipped with means for separation of oil and water, for example a tank fitted with a series of baffles, so that the oil can be stored and the water returned to the sea.

If the storage vessel is a large tanker, the amount of effort required to pump recovered oil and water aboard in a conventional manner in considerable. Preferably such a vessel is modified to take on the oil and water at a low level, e.g., by an entry port near or below sea level.

Preferred barriers comprise a single air chamber, a single ballast chamber, a single discharge tube and a single membrane. However, the function of each of these may be achieved by replacing each of them or all of them with two or more separate items if desired.

The barrier is preferably used in conjunction with sections of standard barrier of the type described in British patent specifications 1188156, 1383315 or co-pending application No. 43513/76. The combined barrier is preferably used in a J configuration with sections of standard barrier forming the arms and being attached to a support vessel or sea anchors and a section of weir barrier according to the present invention forming the curved base where the oil collects.

The invention is illustrated with reference to FIGS. 1–5 of the accompanying drawings wherein FIG. 1 is a vertical cross section of a weir trap boom.

Figure 1:
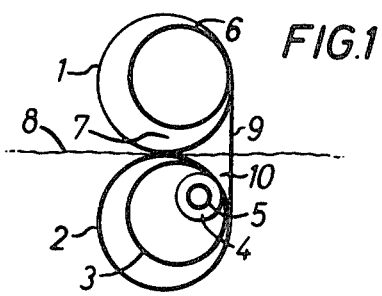
Figure 2:
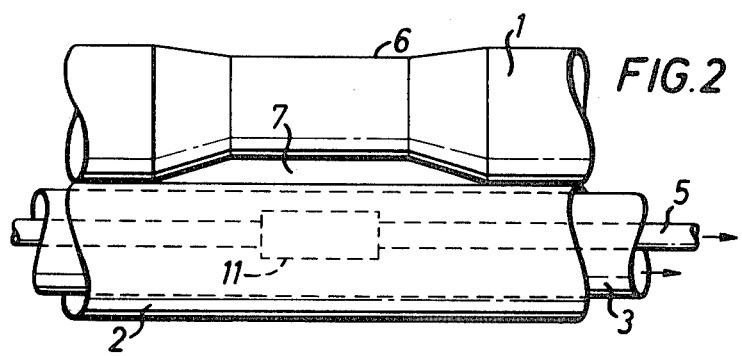
FIG. 2 is a side elevation of the boom of FIG. 1.

With reference to FIGS. 1 and 2, the weir trap boom comprises a buoyant air chamber 1, a water ballast chamber 2, and inside the chamber 2 an oil and water delivery tube 3 containing a hydraulically operated pump unit 4 supplied with hydraulic fluid by a line 5.

The air chamber 1 has sections 6 of reduced diameter which leave gaps 7 between the air chamber 1 and the water chamber 2.

In use the boom floats in relation to sea water level 8 as shown in FIG. 1. The gaps 7 thus create weirs over which the interface of oil and water flows. A membrane 9 affixed at its upper end to the air chamber 1 and at its lower end to the water tube 2 co-operates with the latter to form a gallery 10 which retains the mixture of oil and water before it is removed from the boom.

Removal is effected through apertures 11 in the water tube 2 from which pump units 4 take suction.

Figure 3:
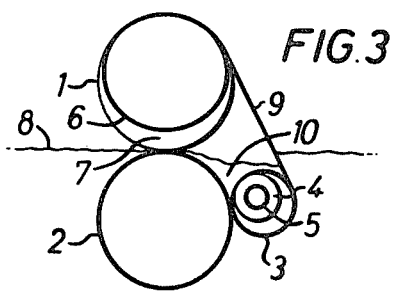
FIG. 3 is a vertical cross section of a second type of weir trap boom.
Figure 4:
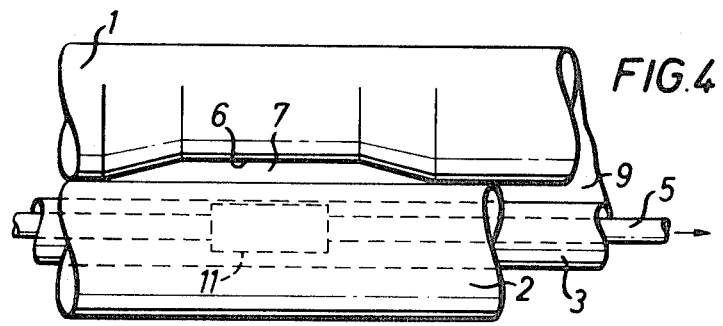
FIG. 4 is a side elevation of the boom of FIG. 3.

The embodiment shown in FIGS. 3 and 4 is similar to that shown in FIGS. 1 and 2. The major difference lies in the fact that the oil and water delivery tube 3 is positioned outside the water chamber 2 and therefore the membrane 9 is connected to the air chamber 1, as before, but then to the oil and water delivery tube 3.

This configuration has the advantages of greater ease of construction, better access to the pump units for installation and servicing and higher gallery capacity.

Figure 5:
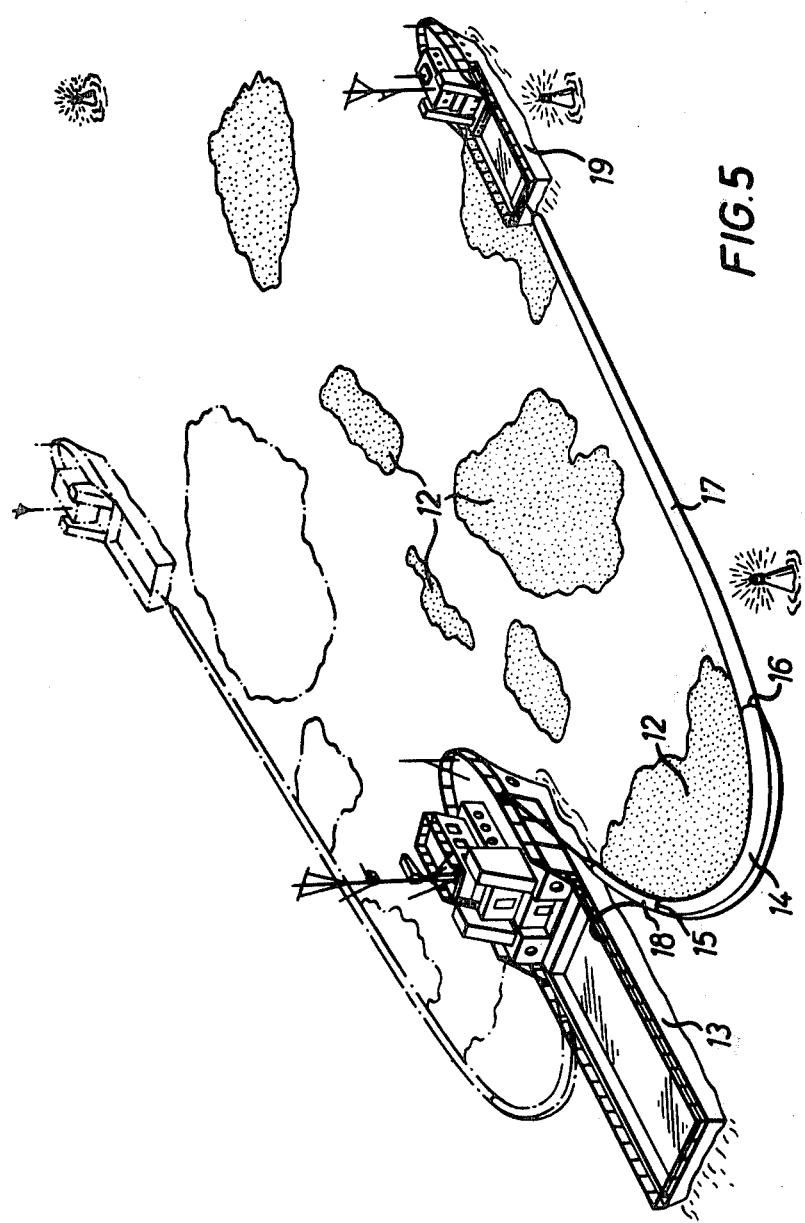
FIG. 5 is a schematic representation of a deployed boom system.

FIG. 5 shows an oil spillage 12 which is drifting in the direction of a service vessel 13 to which a barrier 14 according to the present invention has been attached. 14 is connected at points 15 and 16 to conventional barriers 17 and 18 which may be of the type described in UK patent application 43513/76. These in turn are connected respectively to service vessel 13 and boom deployment vessel 19 which provides the power to inflate the various chambers of the barrier appropriately. In practice the air and water chambers of the conventional barriers 17 and 18 can be connected directly with the corresponding chambers of the barriers according to the present invention. The oil and water delivery tube, not shown in FIG. 5, runs to a point in the service vessel 13 so that the oil water mixture from the weirs is pumped to an appropriate place within the vessel where separation can be effected. The separated oil can then be stored in the vessel and water, once sufficiently purified, can be returned to the sea.

The system as shown in FIG. 5 can continue in operation for long periods provided that the vessel 13 and the support boat 19 can keep station around the oil spillage 12 in such a way that the oil is driven into the weir boom section 14.

I claim:

1. A barrier for the containment and recovery of oil spilt on water, the barrier comprising an elongate, flexible, buoyant, inflatable air chamber having a plurality of sections of reduced diameter, an elongate, flexible, inflatable ballast water chamber; an elongate, flexible oil and water discharge tube; and an elongate membrane, one end of the membrane being connected to the exterior of the air chamber and the other to the exterior of the ballast water chamber or the oil water discharge tube to form a gallery; the buoyant air chamber and the oil and water discharge tube being joined to the ballast water chamber in side-by-side relationship; the chambers, tube and membrane being so positioned relative to one another that when in use on oil polluted water the buoyant air chamber and the ballast water chamber together form a barrier for oil spilt on water except in the sections of reduced diameter of the buoyant air chamber; these sections and the ballast water chamber defining a series of weirs for oil and water to pass into the gallery; the oil and water discharge tube being provided with means to remove oil and water from the gallery.

2. A barrier according to claim 1 wherein the oil and water discharge tube is inside the ballast water chamber, the gallery being formed by the ballast water chamber and the membrane.

3. A barrier according to claim 1 wherein the oil and water discharge tube is outside the ballast water chamber, the gallery being formed by the ballast water chamber, the oil and water discharge tube and the membrane.

4. A barrier according to any of the preceding claims wherein the ratio of the cross sectional area of the unreduced sections of the buoyant air chamber to the cross sectional area of the ballast water chamber is in the range 1:4 to 4:1.

5. A barrier according to claim 1 wherein the sections of the buoyant air chamber of reduced diameter are produced by tapering the diameter of the air chamber to a lesser value than the original, maintaining the diameter at the lesser value for some length and increasing the diameter to its original length.

6. A barrier according to claim 1 wherein the sections of reduced diameter extend in total over 10–50% of the length of the barrier.

7. A barrier according to claim 6 wherein the sections of reduced diameter extend in total over 15–30% of the length of the barrier.

8. A barrier according to claim 1 wherein the diameter of the air chamber in the sections of reduced diameter is reduced by a value in the range 10 to 50% of the original diameter.

9. A barrier according to claim 8 wherein the diameter of the air chamber in the sections of reduced diameter is reduced y 15-30% of the original diameter.

10. A barrier according to claim 1 wherein the means for removing oil and water from the gallery comprises a series of drainage holes in the oil and water discharge tube opening into the gallery.

11. A barrier according to claim 10 wherein the drainage hole are positioned along the join of the oil and water discharge tube with the ballast water chamber.

12. A barrier according to claim 1 wherein pumps are provided in the oil and water discharge tube positively to pump oil and water from the barrier through the tube.

* * * * *